United States Patent
Kaneko et al.

[11] Patent Number: 5,514,468
[45] Date of Patent: May 7, 1996

[54] MAGNETO-OPTICAL RECORDING MEDIUM

[75] Inventors: Hideo Kaneko, Kanagawa; Katsushi Tokunaga, Osaka; Yoshio Tawara, Kanagawa; Yoshiaki Shimizu, Kanagawa; Tadao Nomura, Kanagawa, all of Japan

[73] Assignee: Shin-Etsu Chemical Co., Ltd., Tokyo, Japan

[21] Appl. No.: 145,173

[22] Filed: Nov. 3, 1993

Related U.S. Application Data

[63] Continuation-in-part of Ser. No. 870,428, Apr. 17, 1992, abandoned.

[30] Foreign Application Priority Data

Apr. 17, 1991 [JP] Japan ................................ 3-112416

[51] Int. Cl.⁶ ........................ B32B 3/02; B32B 5/16; G11B 5/66
[52] U.S. Cl. .................. 428/332; 428/64.3; 428/336; 428/694 DE; 428/694 RL; 428/694 SC; 428/694 MT; 428/694 RE; 428/900; 360/131; 360/135; 365/122; 369/13; 369/14
[58] Field of Search .............. 428/694 DE, 694 RL, 428/900, 64, 65, 332, 336, 64.3, 694 SC, 694 MT, 694 RE; 360/131, 135; 365/122; 369/13, 14

[56] References Cited

U.S. PATENT DOCUMENTS

| | | | |
|---|---|---|---|
| 4,792,474 | 12/1988 | Murakami et al. | 428/64 |
| 4,917,970 | 4/1990 | Funkenbusch | 428/694 |
| 5,055,353 | 10/1991 | Yamamato et al. | 428/694 |

FOREIGN PATENT DOCUMENTS 254648  10/1990  Japan.

*Primary Examiner*—Leszek Kiliman
*Attorney, Agent, or Firm*—Wenderoth, Lind & Ponack

[57] ABSTRACT

A magneto-optical recording medium having a layered structure consisting of a first dielectric layer, magnetic recording layer, second dielectric layer and reflecting layer successively formed on a transparent substrate plate can be imparted with improved performance relative to the recording sensitivity and the C/N ratio when the recording layer and the second dielectric layer each have such a thickness that the angle $\delta$ given by the equation $\delta=\tan^{-1}(\epsilon/\theta k)$, in which $\epsilon$ is the Kerr ellipticity of the regenerative light and $\theta k$ is the Kerr rotation angle, does not exceed 10°, the thickness of the recording layer being in the range from 8 nm to 13.5 nm and the thickness of the second dielectric layer satisfying the relationship given by the inequality $$0.06 \leq nd/\lambda \leq 0.14,$$

in which d is the thickness of the second dielectric layer, $\lambda$ is the wavelength of the regenerative light for reading-out of the recorded signals and n is the refractive index of the material forming the second dielectric layer to the regenerative light of wavelength $\lambda$.

3 Claims, 5 Drawing Sheets

னொ5,514,468

MAGNETO-OPTICAL RECORDING MEDIUM

BACKGROUND OF THE INVENTION

This is a continuation-in-part application from a U.S. patent application Ser. No. 07/870,428 filed Apr. 17, 1992 now abandoned.

The present invention relates to a magneto-optical recording medium or, more particularly, to a magneto-optical recording medium having greatly improved recording sensitivity and capable of giving a high C/N ratio.

Along with the rapid progress of the society toward higher and higher importance of information, development of recording media of large recording capacity is eagerly desired and so-called magneto-optical discs are highlighted in this regard as a promising rewritable recording medium. Extensive investigations have been and are being undertaken with an object to upgrade the performance of magneto-optical recording media while the most important problems therein include increasing of the data-transfer velocity and in the recording sensitivity in order to decrease the access time.

In the magneto-optical recording media now under practical use, the recording element is a thin film formed, on a transparent dielectric layer, of an alloy of transition metals including a rare earth metal such as an alloy of terbium, iron and cobalt, referred to as a TbFeCo alloy hereinbelow. A problem in a recording layer formed from a TbFeCo alloy is the relatively small Kerr rotation angle which is only about 0.3°. In order to compensate this small value of the Kerr rotation angle, various attempts and proposals have been heretofore made to increase the C/N ratio in playing back of the recorded signals, of which Japanese Patent Kokai 62-27458 proposes a four-layered structure formed on a transparent substrate plate including, successively, a first dielectric layer, a recording layer of the magnetic alloy, a second dielectric layer and a metallic reflecting layer formed on a transparent substrate plate.

It is important in the design of the above mentioned four-layered structure to adequately select the material and thickness of each of the layers in order to obtain an optimum effect of enhancement of the Kerr rotation angle as well as from the standpoint of the thermal effect. In the conventional four-layered structure, however, the first dielectric layer is also under duty for the enhancement of the Kerr rotation angle so that the material and thickness thereof are under limitation by the optical characteristics. The limitation in this regard is sometimes incompatible with the other requirements for the material and thickness that the first dielectric layer must play a role as a protecting film for the recording layer. Assuming that the thickness of the first dielectric layer is d, wavelength of the incident light is λ and refractive index of the dielectric layer is n, for example, it is taught in Japanese Patent Kokai 2-240845 that an equation of $d=\lambda/(4n)$ is held for these parameters and the value of n should be about 2.0 or larger in order to obtain an increased Kerr rotation angle.

In this regard, a proposal has been made in Japanese Patent Kokai 2-226531 for a modified design of the four-layered structure that the first dielectric layer is exempted from the duty for the enhancement effect to serve only as a protecting film leaving the duty for the enhancement effect solely to the second dielectric layer. This method is indeed advantageous in respect of the possibility of free selection of the material and thickness of the first dielectric layer. A problem there, however, is that, not withstanding the teaching that the effect of enhancement can be obtained in the second dielectric layer, no full enhancement can be obtained in the second dielectric layer because the thickness of the recording layer is so large as not to permit transmission of the light therethrough. An alternative proposal is made in Japanese Patent Publication 2-63562 to decrease the thickness of the recording layer though in consideration of only the increasing effect on the Kerr rotation angle paying no attention to the problem of the recording sensitivity.

The inventors have previously discovered that the recording sensitivity of a magneto-optical recording medium can be improved when the first dielectric layer is formed from a material having a relatively small refractive index enabling decrease of the thickness of the recording layer and leaving the duty of the enhancement effect on the Kerr rotation angle mainly to the second dielectric layer. A problem left unsolved by this method is that the value of the C/N ratio cannot be large enough by the optimization of thickness of the respective layers so as merely to have the maximum values of the Kerr rotation angle and the reflectivity so that it is a conclusion that the Kerr ellipticity must also be taken into consideration besides the Kerr rotation angle in order to obtain a sufficiently large C/N ratio. Further, the problems relative to the thickness of the respective layers in a four-layered structure is discussed in U.S. Pat. Nos. 4,792,474 and 4,917,970 with, however, absolutely no consideration on the Kerr ellipticity.

When a linearly polarized light enters a magnetic layer, the reflected light is converted to some extent from the linearly polarized light to an elliptically polarized light along with rotation of the plane of polarization or so-called Kerr rotation. The extent of this conversion of the reflected light into an elliptically polarized light i called the Kerr ellipticity which is exhibited in an optical head of a magneto-optical disc drive as a phase difference between the polarized light P and the polarized light S. The C/N ratio of the play-back signals is degraded depending on the total of the phase difference due to the optical head and the phase difference due to the Kerr ellipticity caused by the layered structure of the recording medium. Since the phase difference due to the optical head differs between magneto-optical disc drives so that there may be a case in which the C/N ratio varies greatly from drive to drive as a consequence of summing up of the phase difference due to the optical head and that due to the recording medium so that the Kerr ellipticity due to the recording medium should be as small as possible.

Japanese Patent Kokai 2-254648 proposes to decrease the Kerr ellipticity in a layered structure of a magneto-optical recording medium in which the recording layer has a thickness of 25 to 30 nm and the enhancement effect on the Kerr rotation angle is obtained in the first dielectric layer. This layered structure, however, has a disadvantage that the material and thickness of the first dielectric layer are limited not to give an increasing effect on the recording sensitivity.

SUMMARY OF THE INVENTION

The present invention accordingly has an object to provide a novel and improved magneto-optical recording medium free from the above described problems and disadvantages in the magneto-optical recording media of a layered structure.

Thus, the magneto-optical recording medium provided by the invention is an integral body consisting of a substrate plate, a first dielectric layer formed on the substrate plate, a recording layer formed on the first dielectric layer, a second dielectric layer formed on the recording layer and a reflecting layer formed on the second dielectric layer, in which each of the recording layer and the second dielectric layer has such a thickness that the angle δ given by the equation $\delta=\tan^{-1}(\epsilon/\theta k)$, in which ε is the Kerr ellipticity of the regenerative light and θk is the Kerr rotation angle, does not exceed 10°, the thickness of the recording layer being in the range from 8 nm to 18 nm or, preferably, in the range from 8 nm to 13.5 nm and the thickness d of the second dielectric layer satisfying the relationship given by the inequality of $0.06 \leq nd/\lambda \leq 0.14$, in which d is the thickness of the second dielectric layer, λ is the wavelength of the regenerative light to the layer for reading-out of the recorded signals and n is the refractive index of the material forming the layer to the regenerative light

DETAILED DESCRIPTION OF THE PREFERRED EMBODIMENTS

Figure 1:
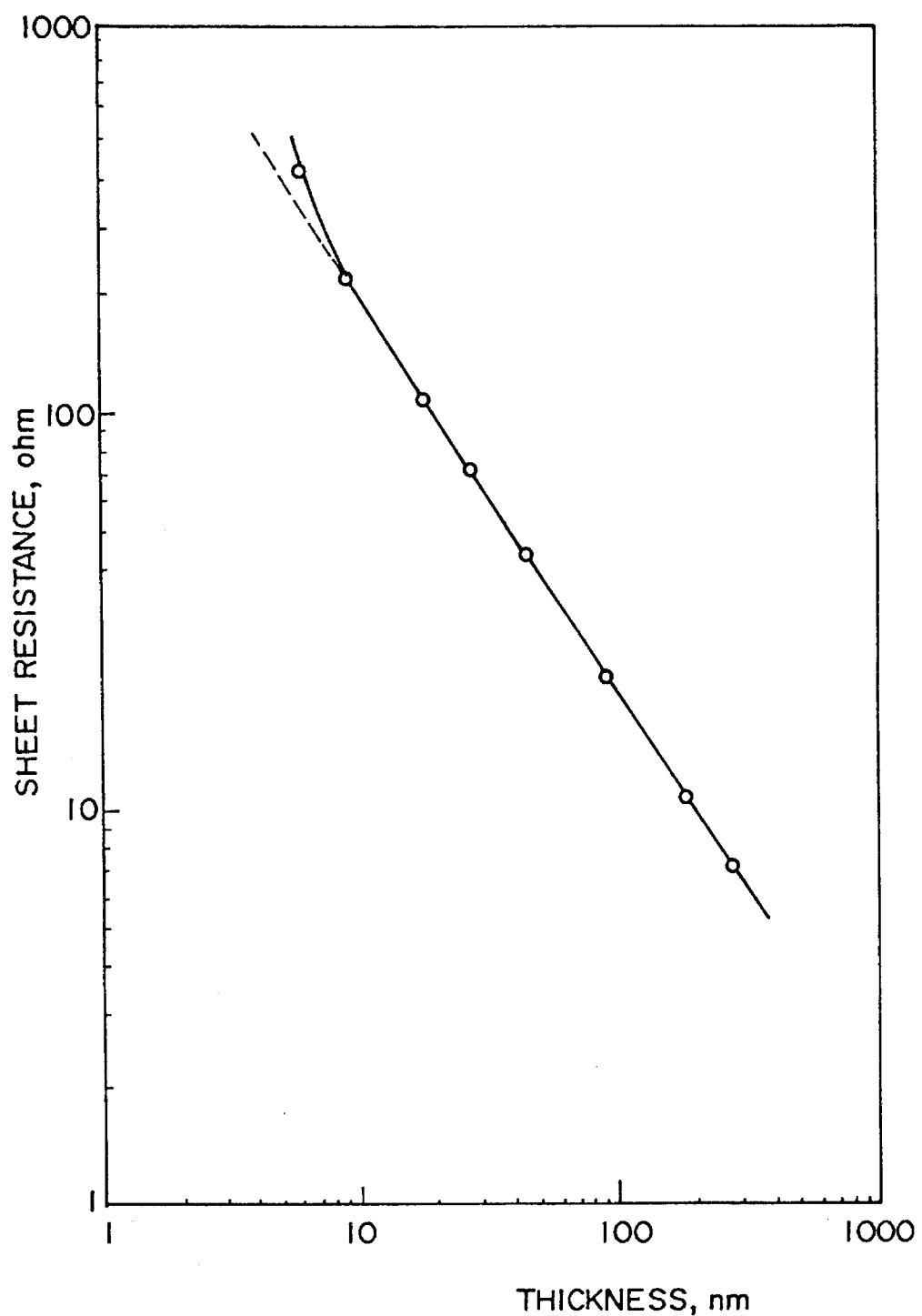
FIGS. 1 and 2 are each a graph showing the sheet resistance and the coercive force, respectively, of the recording layer in magneto-optical recording media as a function of the thickness of the layer.

As is described above, the most characteristic feature in the inventive magneto-optical recording medium having a greatly improved recording sensitivity and a high C/N ratio consists in the unique selection of the thickness of each of the recording layer and the second dielectric layer in the layered structure so as to satisfy the specific relationship between the Kerr ellipticity ε of the regenerative light and the Kerr rotation angle θk, the thickness of the recording layer being within a specified range.

Namely, the Kerr ellipticity ε of the regenerative light and the Kerr rotation angle θk satisfy the requirement that the angle δ defined by the equation $\delta=\tan^{-1}(\epsilon/\theta k)$ does not exceed 10° assuming that the thickness of the recording layer is in the range from 8 nm to 13.5 nm in the layered structure of a magneto-optical recording medium.

The layered structure per se of the inventive magneto-optical recording medium is rather conventional as consisting of four layers successively formed on a substrate plate including a first dielectric layer, a recording layer, a second dielectric layer and a reflecting layer. The material of the substrate plate is not particularly limitative and various kinds of transparent materials can be used therefor including various grades of glass and various synthetic resins such as polycarbonate resins, polyolefins, poly(methyl methacrylate) resins and the like though not particularly limitative thereto. The magnetic alloy forming the recording layer is also not particularly limitative including various types of alloys of transition metals including a rare earth metal such as the TbFeCo alloys. In particular, alloys of a rare earth metal and one or more other transition metals are preferred in respect of the low noise level and TbFeCo alloys are more preferable in respect of their Curie point and good corrosion resistance. Further, the reflecting layer is formed from a metal of high reflectivity such as aluminum and aluminum-based alloys. It is optional that the substrate plate is provided with a thin protecting coating film having electroconductivity such as a film of tin oxide SnO on the surface opposite to the first dielectric layer in order to prevent deposition of dusts or occurrence of scratches.

Various inorganic materials can be used for forming the first dielectric layer provided that the layer thereof is a material impermeable to oxygen and moisture and can be selected from the group consisting of SiN, AlN, AlSiN, SiC, BN, SiCN, SiO and the like containing or not containing hydrogen. The thickness of the first dielectric layer is preferably 60 nm or smaller or, more preferably, 35 nm or smaller in view of the possible troubles with a dielectric layer of a large thickness such as exfoliation of the layer, crack formation in the layer and warping of the substrate plate although the prior art teaches a larger thickness of 70 to 120 nm with a refractive index of about 2 or larger in respect of the optical limitation or 130 nm or larger in respect of the protecting effect in the conventional layered structure of the magneto-optical recording medium in which enhancement of the Kerr rotation angle is obtained in the first dielectric layer.

As is understood from the above given description, selection of the thickness of the recording layer is the first choice to be made although the thickness cannot be too small because, when formation of a recording layer having a very small thickness is intended, the layer formed can no longer be a continuum but is formed in discrete areas. Formation of the recording layer in such discrete areas can well be demonstrated by measuring the sheet resistance of the recording layer formed on the first dielectric layer. Thus, a substrate plate of glass was firstly provided with a film of SiN having a thickness of 20 nm as the first dielectric layer, secondly with a film of a TbFeCo alloy as the recording layer having a varied thickness and thirdly with a film of SiN having a thickness of 30 nm as the second dielectric layer and the sheet resistance of the recording layer having a varied thickness was measured to give the results shown in FIG. 1 which gives the value of the sheet resistance in ohm as a function of the thickness of the layer in nm plotted on logarithmic scales. As is shown by the graph, a good linearity of the curve was obtained in the thickness region above a certain lower limit of about 8 nm and the sheet resistance deviated from and was much larger than that according to the logarithmic linearity rule when the thickness was further decreased to be smaller than the limit indicating that the recording layer was formed in discrete areas and not in a continuum. This is the reason for the lower limit 8 nm of the thickness of the recording layer.

As to the upper limit of the thickness of the recording layer, reference can be made to the results obtained in Example 1 described below, from which it is understood that the maximum thickness of the recording layer should be 18 nm or, in particular, 13.5 nm in order that the optimum recording power can be 10 mW or smaller corresponding to the maximum power output of lasers conventionally under practical use in magneto-optical recording media. Thus, the thickness of the recording layer should be in the range from 8 nm to 13.5 nm so as to give a magneto-optical recording medium having a high recording sensitivity with stability in the recording characteristics. When the thickness of the recording layer is too large, the recording sensitivity of the magneto-optical recording medium is somewhat decreased, especially, at high velocity revolution. Further, assuming the identical reflectivity and Kerr rotation angle, the C/N ratio can be large enough when the thickness of the recording layer is 13.5 nm or smaller as compared with a recording layer of larger thickness.

Figure 2:
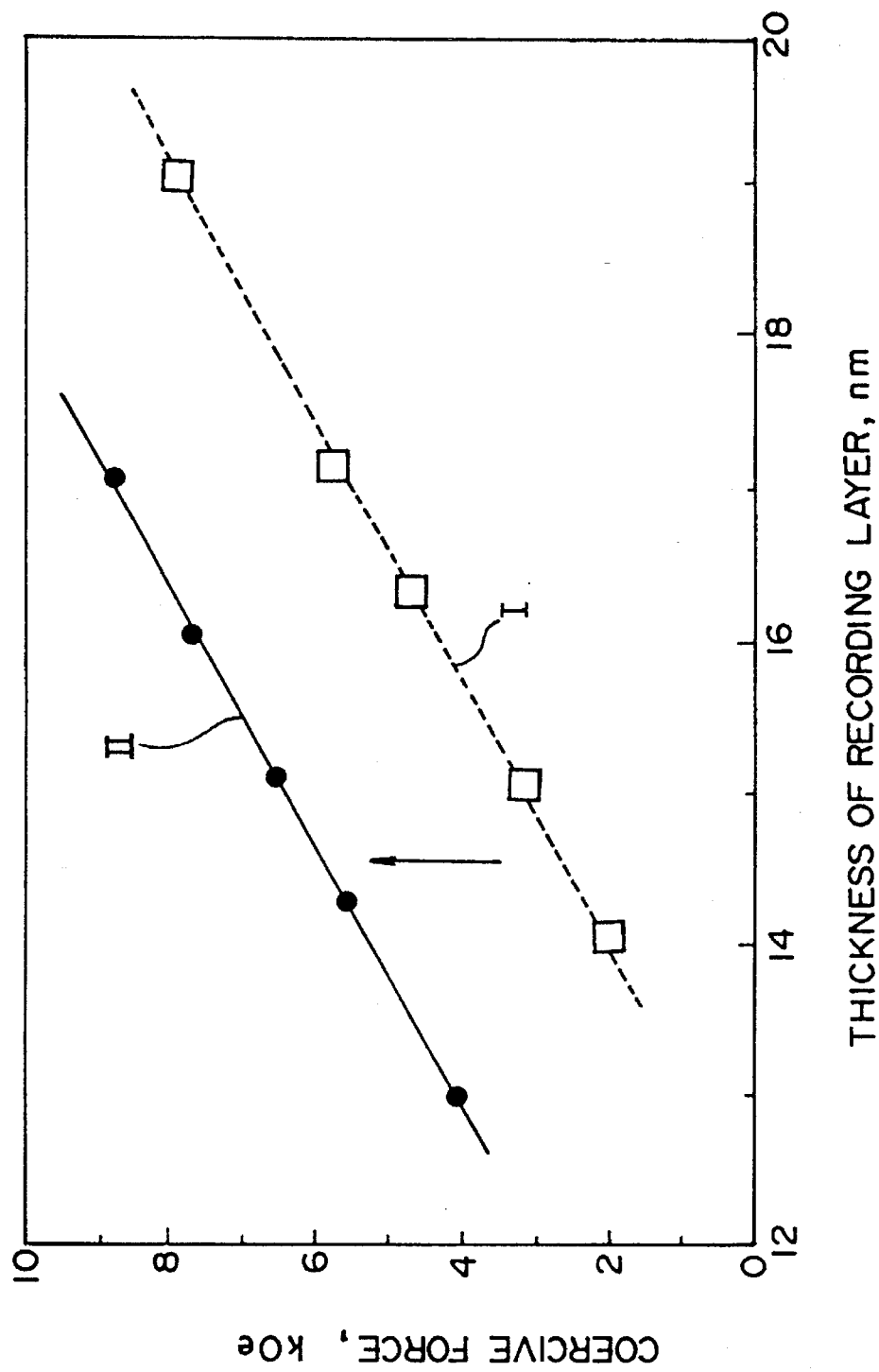

It is taught in Japanese Patent Kokai 2-240845 that the coercive force of the recording layer is decreased as the thickness of the layer is decreased. Indeed, a linear relationship was found as is shown in FIG. 2 giving the value of the coercive force of the recording layer as a function of the thickness of the layer. This problem can be solved at least partly by increasing the content of terbium metal in the TbFeCo alloy. Namely, the coercive force vs. layer thickness relationship was determined for the TbFeCo alloys having chemical compositions, one, of the formula $Tb_{20}(Fe_{0.9}Co_{0.1})_{80}$ and, the other, of the formula $Tb_{20+\alpha}(Fe_{0.9}Co_{0.1})_{80-\alpha}$, in which $\alpha$ is a positive number of 3, to give the results concurrently shown by the two curves I and II, respectively, in FIG. 2.

In the next place, it is essential in the inventive magneto-optical recording medium that the phase difference $\delta$ defined by the equation $\delta = \tan^{-1}(\epsilon/\theta k)$, in which $\epsilon$ is the Kerr ellipticity of the regenerative light and $\theta k$ is the Kerr rotation angle, does not exceed a certain upper limit. In this regard, reference can be made to the results obtained in Example 2 described below, according to which the upper limit of the angle $\delta$ should be 10° so that a high C/N ratio can be obtained.

Figure 3:
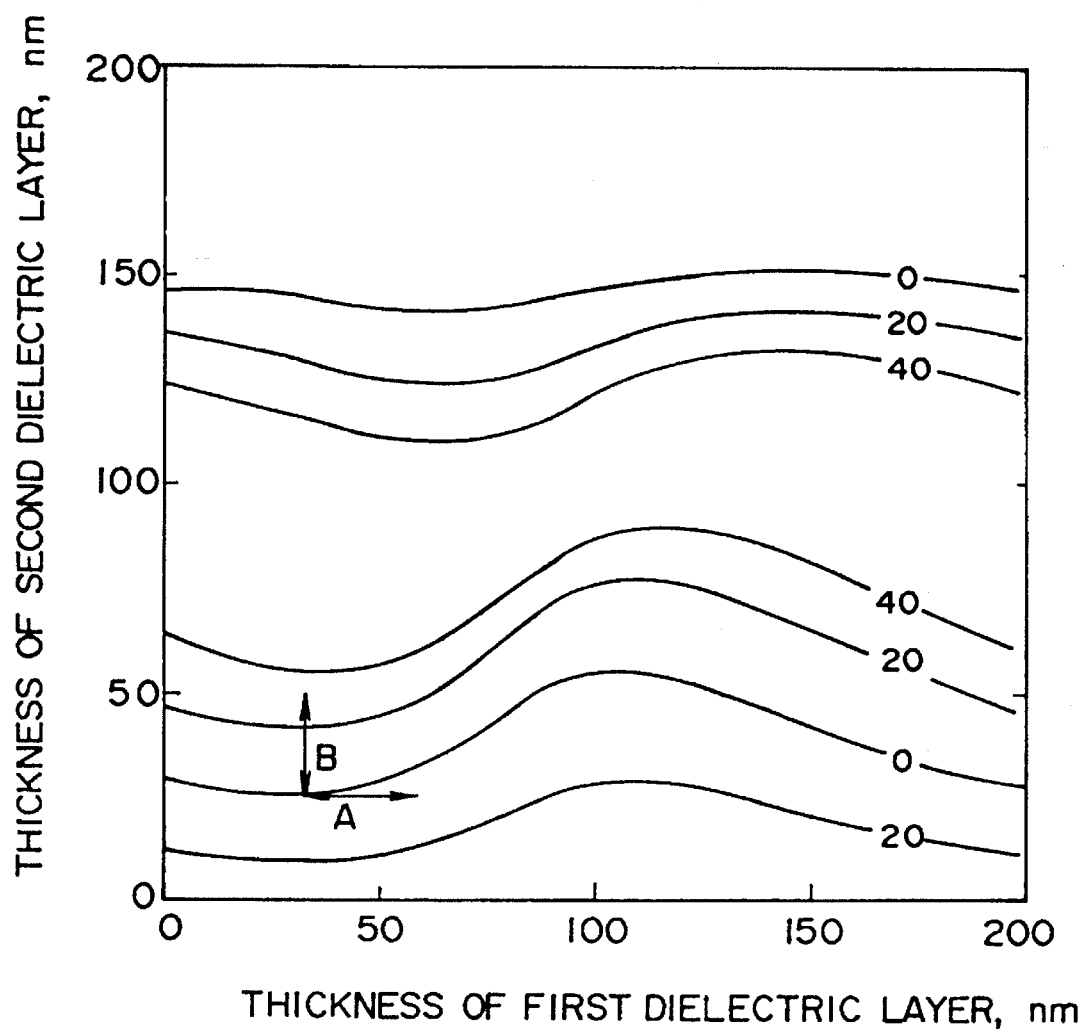
FIG. 3 is a graph showing equivalent angle curves for the phase difference δ taking the thickness values of the first and the second dielectric layers in magneto-optical recording media as the abscissa and as the ordinate, respectively.

In order to estimate the value of $\delta$ in relation to the thickness of the dielectric layers, simulating calculations were made for the values of $\delta$ assuming that the incident light has a wavelength of 780 nm, the recording layer formed from an alloy of TbFeCo has a thickness of 13 nm, the first and the second dielectric layers were formed from SiN each having a varied thickness and the reflecting layer was formed from aluminum to give the results shown in FIG. 3 which is a diagram to give the equivalent angle curves for the phase difference $\delta$ due to the Kerr ellipticity taking the thickness of the first dielectric layer and the thickness of the second dielectric layer as the abscissa and ordinate, respectively. The numerical figure on each of the curves is the value of $\delta$ in degrees. This diagram indicates much larger dependency of $\delta$ on the thickness of the second dielectric layer than on the thickness of the first dielectric layer. Imagine a point on FIG. 3 corresponding to the thickness of 30 nm for the first dielectric layer and 25 nm for the second dielectric layer to give 0° of the angle $\delta$, for example, so that it is understood that a shift of 25 nm in the thickness of the first dielectric layer as is indicated by the arrow A results in an increase of only 10° or less in the value of $\delta$ while a shift of 25 nm in the thickness of the second dielectric layer as is indicated by the arrow B results in an increase of more than 30° in the value of $\delta$.

In this regard, it is preferable that the thickness d of the second dielectric layer satisfies the relationship given by the inequality $$0.06 \leq nd/\lambda \leq 0.14,$$

in which d is the thickness of the second dielectric layer, $\lambda$ is the wavelength of the regenerative light for reading-out of the recorded signals and n is the refractive index of the material forming the second dielectric layer to the regenerative light of wavelength $\lambda$. This limitation is important in order that the second dielectric layer exhibits the effect of enhancement.

Figure 4:
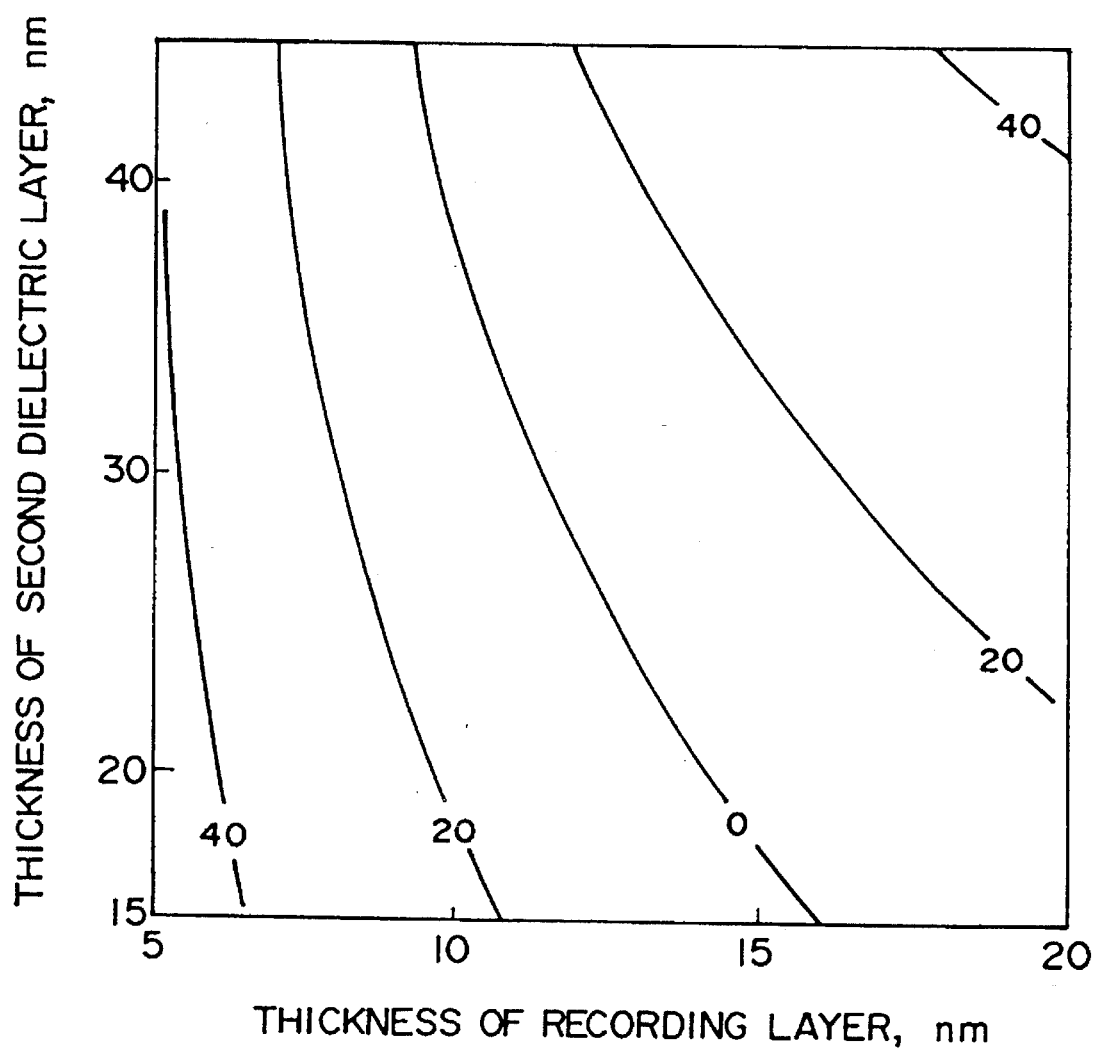
FIG. 4 is a graph showing equivalent angle curves for the phase difference δ taking the thickness values of the recording layer and the second dielectric layer in magneto-optical recording media as the abscissa and as the ordinate, respectively.

FIG. 4 is a diagram to give the equivalent angle curves for the phase difference $\delta$ taking the thickness of the recording layer and the thickness of the second dielectric layer as the abscissa and ordinate, respectively, as a result of the similar simulating calculations undertaken under the same assumptions as above except that the thickness of the first dielectric layer was constant at 30 nm and the thickness of the recording layer was varied. This diagram indicates that the Kerr ellipticity e also depends on the thickness of the recording layer.

The above described dependency of the phase difference $\delta$ on several parameters indicates that optimization of the layered structure of the magneto-optical recording medium taking into consideration the Kerr rotation angle $\theta k$ and the reflectivity R as well as the Kerr ellipticity $\epsilon$ in addition should be made by means of the selection for the values of the thickness of the recording layer and the second dielectric layer. For example, the phase difference $\delta$ can be zero by adequately selecting the second dielectric layer and the recording layer leaving the duty for the enhancement effect to the second dielectric layer so as to enable selection of the thickness and material of the first dielectric layer from the standpoint of the protecting characteristics for the recording layer.

In the following, the magneto-optical recording medium of the present invention is illustrated in more detail by way of examples.

EXAMPLE 1.

Magneto-optical recording media were prepared each by providing a substrate plate of a polycarbonate resin having a diameter of 130 mm and a thickness of 1.2 mm, on which a guide groove for tracking was formed, with a first dielectric layer of SiN in a thickness of 30 to 100 nm, a recording layer of a TbFeCo alloy having a varied thickness of 5 to 25 nm, a second dielectric layer of SiN in a thickness of 15 to 45 nm and a reflecting layer of aluminum having a thickness of 40 nm successively formed thereon by the sputtering method so as to keep approximate constancy of each of the Kerr rotation angle and the reflectivity.

Figure 5:
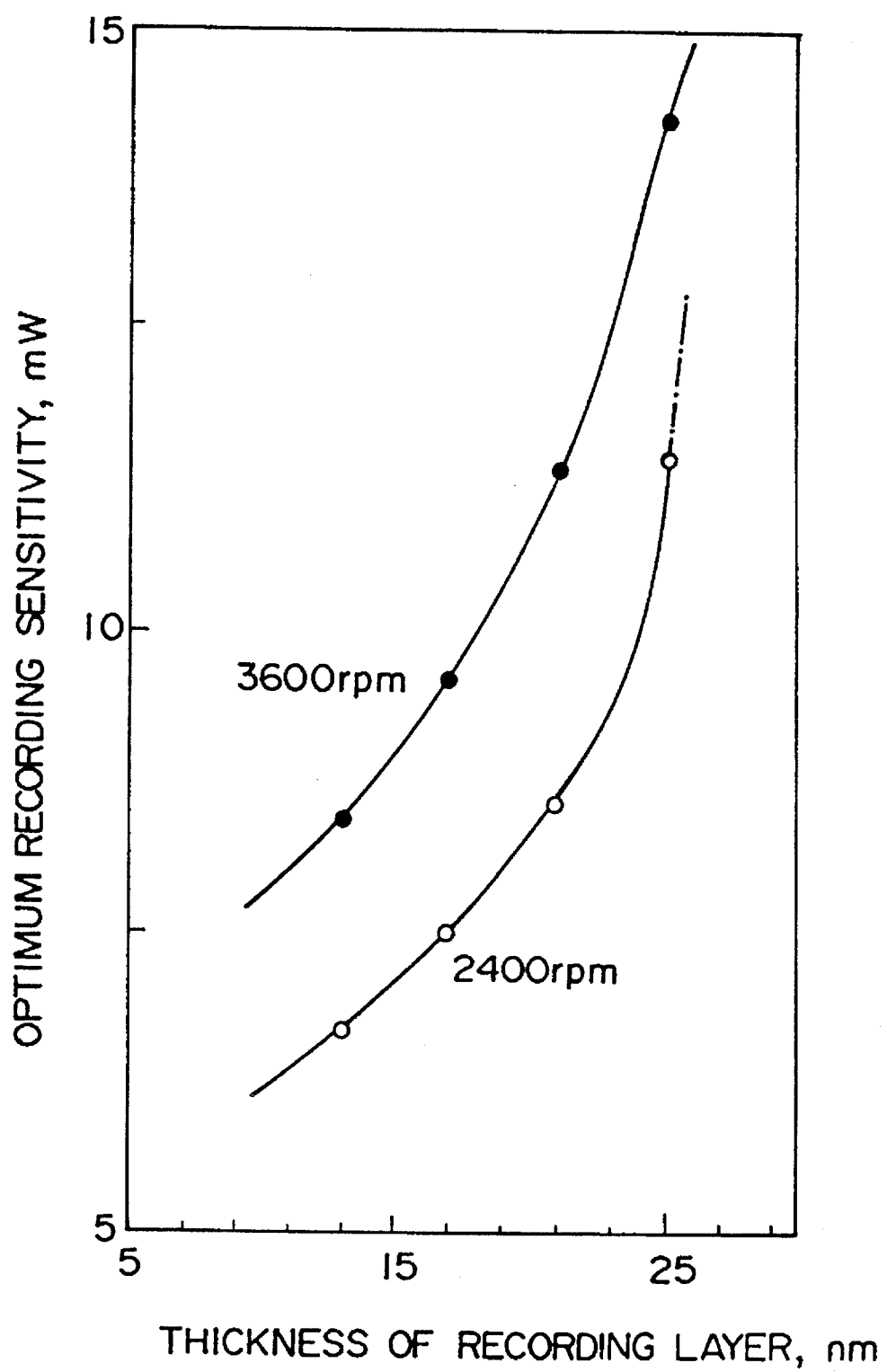
FIG. 5 is a graph showing the optimum recording sensitivity as a function of the thickness of the recording layer in magneto-optical recording media.

The above prepared magneto-optical recording media were each subjected to the measurement of the optimum recording power, which was assumed to give the minimum of the secondary higher harmonics, under the conditions including a frequency of 3.9 MHz, revolution of 2400 rpm or 3600 rpm and distance of the measuring point of 60 mm from the center to give the results shown in FIG. 5 as a function of the thickness of the recording layer. It is understood from these results that the thickness of the recording layer should be 18 nm or smaller when the revolution is 3600 rpm in order that the optimum recording sensitivity does not exceed 10 mW.

EXAMPLE 2.

Three magneto-optical recording media, in which the first dielectric layer had a constant thickness of 30 nm, were prepared each in a manner similar to Example 1 using a polycarbonate resin substrate having a diameter of 86 mm and a thickness of 1.2 mm by the sputtering method. These recording media had an approximately constant Kerr rotation angle and approximately constant reflectivity but had varied values of the Kerr ellipticity. These three recording media were subjected to the measurement of the C/N ratio setting the recording power at the optimum corresponding to the minimum of the secondary higher harmonics under the conditions including a frequency of 3.9 MHz, revolution of 2400 rpm and distance of the measuring point of 24.1 mm from the center to give the results shown in Table 1 below which also indicates the thickness of the recording layer in nm, thickness of the second dielectric layer in nm and calculated values of $\delta=\tan^{-1}$ ($\epsilon/\theta k$) in degrees. The results shown in Table 1 indicate that the C/N ratio can be improved by decreasing the Kerr ellipticity but is little influenced by the value of $\delta$ when it is 10° or smaller.

TABLE 1

| Thickness of recording layer, nm | Thickness of second dielectric layer, nm | $\delta = \tan^{-1}$ ($\epsilon/\theta k$), degrees, calculated | C/N ratio, dB |
| --- | --- | --- | --- |
| 12 | 29 | 2 | 47.3 |
| 13 | 31 | 7 | 47.2 |
| 16 | 38 | 27 | 46.1 |

What is claimed is:

1. A magneto-optical recording medium which is an integral body consisting of a substrate plate, a first dielectric layer formed on the substrate plate, a recording layer formed on the first dielectric layer, a second dielectric layer formed on the recording layer and a reflecting layer formed on the second dielectric layer, wherein each of the recording layer and the second dielectric layer has such a thickness that the angle $\delta$ given by the equation $\delta=\tan^{-1}$ ($\epsilon/\theta k$), in which $\epsilon$ is the Kerr ellipticity of the regenerative light and $\theta k$ is the Kerr rotation angle, does not exceed 10°, the thickness of the recording layer being in the range from 8 nm to 13.5 nm and the thickness of the second dielectric layer satisfying the relationship given by the inequality $0.06 \leq nd/\lambda \leq 0.14$, in which d is the thickness of the second dielectric layer, $\lambda$ is the wavelength of the regenerative light for reading-out of the recorded signals and n is the refractive index of the material forming the second dielectric layer to the regenerative light of wavelength $\lambda$ and wherein the first dielectric layer has a thickness not exceeding 35 nm.

2. The magneto-optical recording medium as claimed in claim 1 wherein the recording layer is formed from a magnetic alloy of a rare earth metal and at least one transition metal other than rare earth metals.

3. The magneto-optical recording medium as claimed in claim 2 wherein the magnetic alloy is a TbFeCo alloy.

\* \* \* \* \*